United States Patent [19]
Albanese

[11] 3,760,836
[45] Sept. 25, 1973

[54] UNDER-FIXTURE VALVE

[76] Inventor: Thomas Albanese, 116 Norlin St., Las Vegas, Nev.

[22] Filed: Feb. 24, 1972

[21] Appl. No.: 229,048

[52] U.S. Cl.............. 137/360, 251/315, 251/317, 251/292, 137/207
[51] Int. Cl............................................. F16k 5/06
[58] Field of Search.................. 251/315, 317, 309, 251/292; 137/357, 15, 207, 360

[56] References Cited
UNITED STATES PATENTS
3,329,397   7/1967   Neuworth ........................ 251/292

FOREIGN PATENTS OR APPLICATIONS
178,418   3/1962   Sweden ............................. 251/315

Primary Examiner—Alan Cohan
Attorney—Pastoriza and Kelly

[57] ABSTRACT

An under-fixture valve comprises an elongated body having an outer diameter corresponding to the pipes normally connected to an outlet water pipe so that the valve body may be threaded to the outlet water pipe and project from a wall structure. The wall structure itself can then be completed and finished with a minimum of interference with the valve body. The valve is closed while work on the wall is being completed so that the main water supply may be left on and there is no necessity for turning off the main water supply when connecting the other end of the valve body to a fixture pipe leading to an overhead fixture. The design is such as to readily accomodate a surge chamber as a part of the under-fixture valve if desired.

5 Claims, 6 Drawing Figures

PATENTED SEP 25 1973   3,760,836

UNDER-FIXTURE VALVE

This invention relates generally to plumbing fixtures and more particularly to an improved under-fixture valve designed to save a plumber's time in the installation of plumbing fixtures such as sinks.

BACKGROUND OF THE INVENTION

It is normal practice to provide an under-fixture valve for connection between a water supply pipe within a wall structure and a fixture pipe leading up to the normal manually operable valve at the fixture. For example, in conventional sinks utilized in offices and homes there is provided a shut-off valve beneath the sink which will permit a person to close off the water supply to the normal valves on the sink so that new washers or other repairs may be made without having to shut off the main water supply.

In the original construction of bathrooms or laboratories where a sink might be used, it is common practice to provide a short pipe section which is connected to the main water supply pipe in the wall, the short section extending laterally from the wall. Finishing operations on the wall are then completed about the short pipe section such as lathing and plastering or inserting of tile. During this finishing operation, it is necessary to turn off the main water supply to prevent flooding of the area. After the wall has been finished, the plumber may then fix the normal under-fixture valve to the short pipe section and connect it up to the sink. After this operation, the plumber will go down to the main water supply valve and turn on the water supply.

The necessity for having to travel down to the main water supply and turn it on after the wall construction and connection of a fixture has been completed is a waste of the plumber's time. Moreover, in the case of multiple dwellings, there may be other plumbing pipes extending from wall structures wherein the wall construction itself has not been completed and inadvertent turning on of the main water supply may flood other areas. The latter problem can be overcome by simply threading a closure end to the extending pipe section from the wall so that the main water supply may remain on while the wall construction is being completed. In this way, other areas in which construction has been completed are not inconvenienced by lack of water. On the other hand, after the one wall construction has been completed and it is desired to connect the normal under-fixture valve the plumber must still temporarily turn off the main water supply while these connections are being effected.

One solution to the foregoing inconveniences would be for the plumber simply to attach the under-fixture valve from the protruding pipe section of the wall and turn it to an off position so that the water supply may be left on while he is finishing the wall area or while a tile man is completing his work. However, this solution is not practical with present day under-fixture valves because of the relative bulkiness of these valves. Thus, there are various lateral projections or enlarged portions of the valve which interfere with finishing of the wall particularly in the placing of tile about the projecting pipe. The situation is particularly aggravated in the event the under-fixture valve includes an anti-hammer surge chamber. The bulk of such a chamber makes it extremely difficult for a wall finisher to work in the area when the under-fixture valve is installed prior to completion of the wall.

BRIEF DESCRIPTION OF THE PRESENT INVENTION

With the foregoing considerations in mind, the present invention contemplates an improved under-fixture valve so designed that the same may be installed along with the water supply piping so that it projects from the wall and yet does not take up any more room than the normal pipe section heretofore utilized to which the under-fixture valve of a normal type would be connected.

More particularly, the improved under-fixture valve comprises an elongated valve body exteriorly threaded at each end and of a dimension corresponding substantially to that of piping designed to connect to the outlet water pipe so that the valve body may be threaded to the outlet water pipe and project from the wall structure and the wall structure itself completed and finished with a minimum of interference with the valve body.

The valve body itself has a straight through water passage and includes a centrally disposed internal valve head in the passage having a hole passing therethrough. Means for rotating the head to a first position in which the hole in the head is in alignment with the passage in the valve body so that the valve is open, and to a second position in which the hole in the valve head is transverse to the passage in the valve body so that the valve is closed, is provided and exposed at an opening on a side of the valve body so that there is no projecting part from the surface of the body to interfere with work in finishing the wall. The valve is closed while such work on the wall is being completed so that the main water supply may be left on and there is no necessity of turning off the main water supply when connecting the other end of the valve body to the usual fixture pipe leading to an overhead fixture such as a sink.

The design of the improved under-fixture valve is such as to cooperate with an anti-hammer surge chamber if such is desired which chamber may be readily connected to the valve at the time of completing installation of the sink or other plumbing fixture.

A feature of the valve design which enables easy cooperation with such a surge chamber also facilitates the use of the under-fixture valve as a normal valve to be inserted in any given pipe section.

BRIEF DESCRIPTION OF THE DRAWINGS

A better understanding of the invention will be had by now referring to the accompanying drawings, in which.

DETAILED DESCRIPTION OF THE INVENTION

Figure 1:
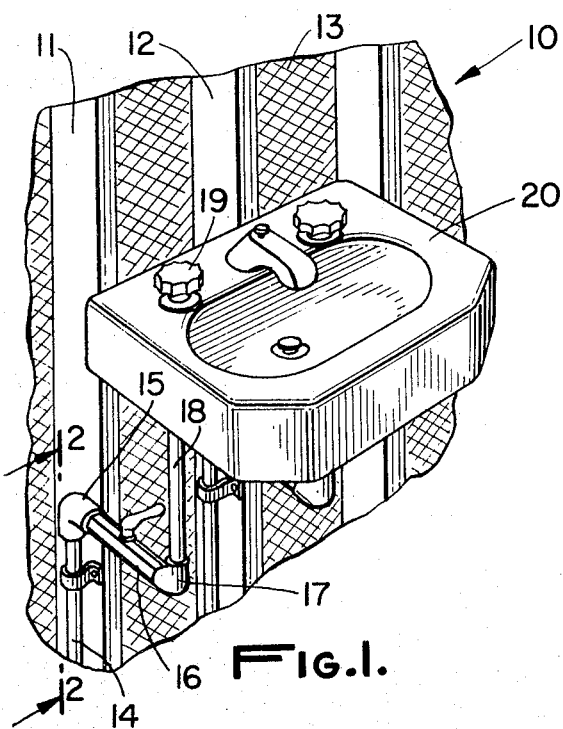
FIG. 1 is a fragmentary perspective view of a typical sink fixture with which the under-fixture valve of the present invention would be used, part of the wall structure for the sink being broken away to facilitate explanation of the invention.

Referring first to FIG. 1 there is designated generally by the numeral 10 an incompleted wall structure which might include studs 11 and 12 with backing tar paper or other material 13. Shown secured to the inside of the stud 11 is a water supply pipe 14 provided with an elbow 15 to which the improved under-fixture valve 16 of this invention is threaded such that the valve 16 projects from the wall structure. To facilitate an understanding of the enviorment, the valve 16 is shown connected at its other end by an elbow 17 to a fixture pipe 18 leading up to a conventional hand operated valve 19 on a sink 20. Normally, these latter connections are not made until after the wall structure 10 is completely finished.

Figure 2:
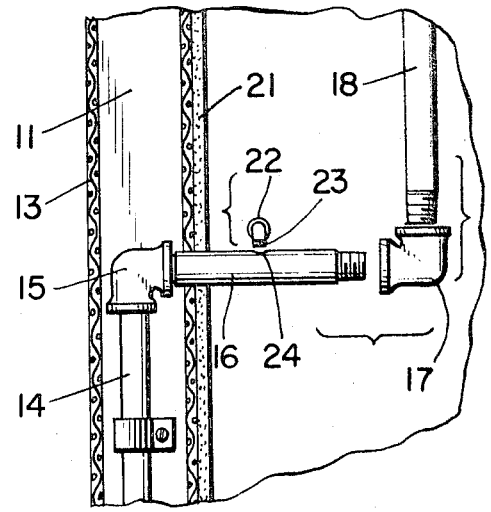
FIG. 2 is a fragmentary cross-section partly exploded of the under-fixture valve and associated plumbing looking generally in the direction of the arrows 2—2 of FIG. 1.

Thus, referring to FIG. 2 there is shown the valve body 16 surrounded by the finished wall which might include lath and plastering 21 or tile work. After the wall is finished, a manual turning means in the form of a handle 22 having a projecting flat 23 may be received in a lateral opening 24 in the valve body 16. As described the elbow 17 and pipe 18 leading to the sink fixture are then assembled.

As also described earlier, it would be normal practice to provide a short pipe section threaded to the elbow 15 to project out from the incompleted wall structure. Thereafter, the wall structure is finished with a minimum of interference with the short pipe section and then the conventional type of under-fixture valve is assembled to the projecting pipe section. Because of the unique design of the improved under-fixture valve 16 of the present invention, this valve replaces the short pipe section in providing a projecting portion from the wall about which the wall itself may be completed and finished. Since the valve body has a dimension corresponding substantially to that of the pipe section conventionally secured to the water supply pipe 14, it is a very simple matter to complete and finish the wall as shown at 21 while the main water supply is simply left on. Subsequently connection to the sink fixture can then take place without the necessity of having to turn off the main water supply. In otherwords, the under-fixture valve 16 of the present invention serves a dual function in that it enables the wall structure to be completed and finished without interference while the water supply is left on and also constitutes the under-fixture valve itself.

Figure 3:
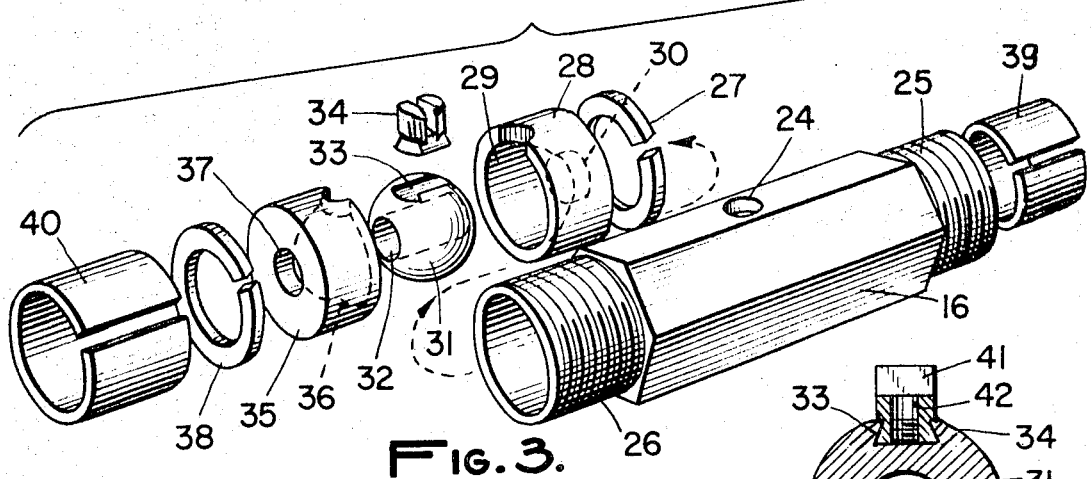
FIG. 3 is an exploded perspective view of the under-fixture valve illustrating various components making up the valve.

Referring now to FIG. 3, details of the under-fixture valve 16 will be described. As shown, the valve comprises an elongated valve body exteriorly threaded as at 25 and 26 and preferably defining wrench flats on its outer surfaces to facilitate threading to the water supply pipe as shown in FIG. 2. The valve body 16 has a straight through water passage from one end to the other and includes on its internal wall first and second axially spaced circumferential notches. These notches (not visible in FIG. 3) will be described in greater detail as the description proceeds.

In assembling the valve, a first split retaining ring 27 as shown in FIG. 3 is received in the first internal notch. Thereafter, a first disc shaped gasket 28 having a hemispherical depression 29 in one face and a central passage 30 is positioned in the body 16 so that its opposite face seats against the first split retaining ring. A valve head in the form of a ball 31 having a diametric hole 32 is then inserted in the pipes so that a surface portion is positioned in the hemispherical depression 29. It will be noted that the ball 31 includes a dovetail shaped channel 33. This channel co-operates with a valve head stem 34 which is receivable through the lateral opening 24 in the valve body 16 as indicated by the dashed lines in FIG. 3. Thus, when assembling the ball 31, the valve stem 34 is received in the lateral opening 24 and the dovetail portion of the valve stem slidably received in the channel 33 of the ball.

After the above-noted components have been assembled, a second disc shaped gasket 35 having a hemispherical depression 36 in one face and a central passage 37 is positioned so that its hemispherical depression engages an opposite portion of the ball 31. A second split retaining ring 38 is then received within the valve body 16 and engaged in the second internal circumferential notch so that the ball is sandwiched between the first and second gaskets to define a valve assembly retained in a central position in the valve body 16 by the retaining rings 27 and 38.

In the preferred embodiment of the invention, the under-fixture valve is completed by the provision of first and second split spacing collars 39 and 40 internally receivable in opposite ends of the valve body 16 to seat respectively against the first and second split retaining rings.

Figure 4:
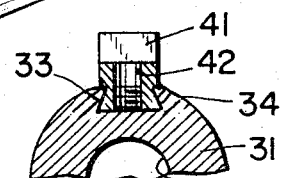
FIG. 4 is a fragmentary cross-section of a portion of the valve of FIG. 3 in assembled relationship.

With reference to FIG. 4, details of the ball 31 and cooperating valve stem 34 described in FIG. 3 are shown. Thus, it will be noted that the stem 34 which constitutes a turning means for the ball 31 has its dovetailed shaped lower portion receivable in the dovetail shaped channel 33 of the ball 31 and terminates at its upper portion in a slot 41. A threaded tap 42 is provided in the floor of the slot for co-operation with an external handle.

Figure 5:
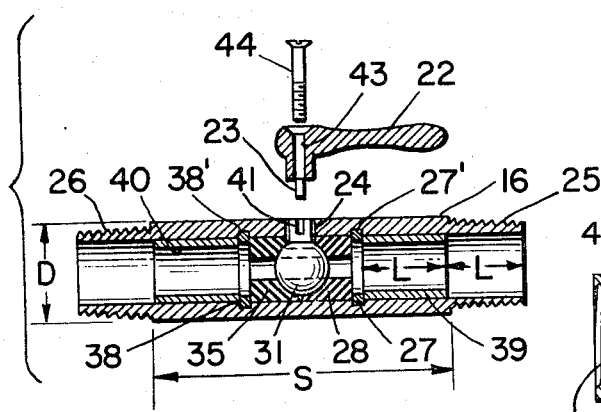
FIG. 5 is a longitudinal cross-section partly exploded showing further assembled portions of the valve of FIG. 3; and, FIG. 6 is a perspective view partly in cross-section of an anti-hammer surge chamber fixture designed to co-operate with the under-fixture valve described in FIGS. 3, 4, and 5.

Referring particularly to FIG. 5, the manner in which the various components described in FIG. 3 are assembled is clear. In FIG. 5, the first and second internal circumferential notches are indicated at 27' and 38' respectively for receiving the first and second split retaining rings 27 and 38. In the position shown in FIG. 5, the ball 31 has its hole aligned with the central passages in the gaskets so that the valve is in an "on" position. It will be noted that the valve stem is exposed in the opening 24 but does not extend beyond the valve body 16. Because of the provision of the slot 41, the ball 31 may be rotated by means of a screwdriver inserted in the slot to rotate the same to a position in which the hole in the ball is transverse to the straight through passage in the valve body in which position, the valve is off. However, as a matter of convenience, after the entire wall structure has been completed and finished and installation is complete, a manually operable handle may optionally be affixed to the valve stem. Towards this end, there is illustrated the handle 22 described in FIG. 2. As shown, the downwardly projecting portion terminating in the flat 23 is designed so that the flat 23 is received in the slot 41 of the valve stem. This projecting portion includes a bore 43 passing between the opposite faces of the flat 23 for receiving a screw 44, the lower end of the screw being received in the threaded tap at the bottom of the slot 41 described in FIG. 4. The handle 22 is thus secured to the valve stem and enables manual movement of the ball 31.

Still referring to FIG. 5, it will be noted that the length L of the spacing collars 39 and 40 is equal to half the distance between the retaining ring against which the collar seats and the end of the valve body 16 receiving the collar, this latter distance being 2L. The spacing collars are not an essential part of the basic invention but are very useful in the event it is desired to insert an on-off valve in any pipe section. For example, the valve body 16 may easily be inserted in a pipe by cutting a section from the pipe of lengths equal to the distance between the far ends of the split collars designated S in FIG. 5. One of the split collars is then removed from one end of the valve body and that end is slid over a portion of the cut end of the pipe until the cut end engages the retaining rings against which the removed collar was originally seated. The other end of the valve body may then be slid over the other end of the cut pipe until this other end seats against the far end of the remaining collar so that the valve body is precisely centrally located between the cut ends of the pipe. The cut ends may then be permanently secured to the valve body.

The provision of the split spacing collars also facilitates connection of an end of the valve to another fixture such as an anti-hammer surge chamber device. For example, referring to FIG. 6 there is shown such an anti-hammer surge chamber in the form of a pipe section 45 having a reduced diameter first end 46 telescopically receivable in the end of the valve body 16 of FIG. 5. The other end of the section 45 terminates in external threads 47 corresponding in size to the threads, for example, 25 on one end of the valve body of FIG. 5. A cooperating nut 48 and compression ring 49 enables a sealing connection to be effected between the end 46 and one end of the valve body, the nut 48 being threadedly connected to the threads 25 by way of example.

The pipe section 45 includes a surge chamber 50 laterally connected to communicate with the internal passage of the section 45 as at 51. A drain plug 52 may be threadedly connected to the pipe section 45 as at 53 to permit draining of the surge chamber 50.

OPERATION

In operation, after the valve body has been assembled as described in FIG. 3, it may be threaded directly to a water supply pipe such as illustrated in FIG. 2. The position of the ball 31 is such that the diametric hole in the ball is transverse to the straight through water passage so that the valve is off. The handle 22 is not connected to the valve body 16 so that the valve body simply protrudes from the incompleted wall structure without occupying any more area than if a simple pipe section locating the water supply pipe were provided.

The main water supply may be turned on and left on and the wall structure itself completed and finished as by tiling or any other suitable finish. Because of the minimal dimensions of the valve body 16, this work may be completed with a minimum of interference.

Figure 6:
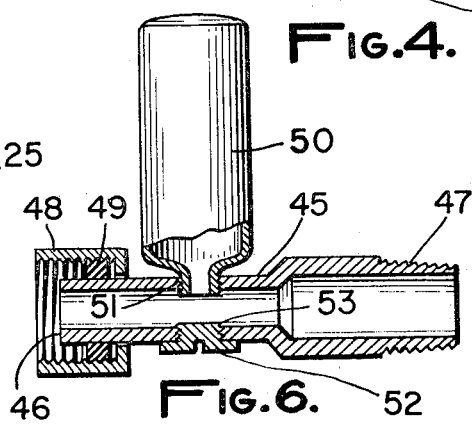

After the wall has been completed, it is not at all necessary for the plumber to turn off the main water supply while he connects up a fixture such as a sink. Rather, the plumber can simply complete these connections and thereafter simply turn on the under-fixture valve. In this respect, if desired, the plumber may provide a handle such as 22 so that in the future, the under-fixture valve may be manually opened or closed as in the case of conventional type under-fixture valves. Since the wall finishing has all been completed, the provision of the handle as well as an anti-hammer surge chamber device as illustrated in FIG. 6 will in no way interfere with other work in the area.

When installing the anti-hammer surge chamber, the nut 48 couples the pipe section 45 to the extending threaded end 25 of the valve body 16. The elbow 17 of FIG. 2 and cooperating fixture pipe 18 are then connected to the other end 47 of the surge chamber pipe section 45. It should be noted that this installation could be made at any time without the necessity of turning off the main water supply. It is only necessary to close the under-fixture valve while connecting in the surge chamber.

It will be evident from the foregoing description, that the improved under-fixture valve of this invention will save a substantial amount of a plumber's time in the construction and installation of plumbing fixtures in buildings. While the under-fixture valve has been described with respect to a sink installation, it should be understood that its unique design features make it very useful in many other types of plumbing systems. The invention accordingly is not to be thought of as limited to the particular installation set forth and described.

What is claimed is:

1. An under-fixture valve for threaded connection at one end to an outlet water pipe within a wall structure and at its other end to a fixture pipe leading to an overhead fixture, comprising, in combination, an elongated valve body exteriorly threaded at each end and of a dimension corresponding substantially to that of piping designed to connect to the outlet water pipe so that said body may be threaded to the outlet water pipe and projected from the wall structure and the wall structure itself completed and finished with a minimum of interference with the valve body, said valve body having first and second axially spaced internal circumferential notches and including:

a. a first split retaining ring received in the first notch;

b. a first disc shaped gasket having a hemispherical depression in one face and a central passage positioned in said body so that its opposite face seats against said first split retaining ring;

c. a ball valve having a diametric hole and a surface portion positioned in said hemispherical depression;

d. a second disc shaped gasket having a hemispherical depression in one face and a central passage positioned in said body so that its one hemispherical depression engages an opposite portion of said ball;

e. a second spilt retaining ring received in the second notch to engage the opposite face of said second disc shaped gasket whereby said ball is sandwiched between the first and second gaskets to define a valve assembly retained in a central position in said body by the retaining rings;

f. means for rotating said ball about a diameter to a first position in which the hole in said ball is in alignment with the central passages in the gaskets so that said valve is open, and to a second position in which the hole in said ball is transverse to the central passages in the gaskets so that said valve is closed, said means being exposed through an opening on a side of said body so that there is no projecting part from the surface of said body to interfere with work in finishing the wall, the valve being closed while such work on the wall is being completed so that the main water supply may be left on and there is no necessity of turning off the main water supply when connecting said other end of said valve to said fixture pipe leading to an overhead fixture; said means including a valve head stem receivable in said opening on the side of said body and terminating in a dovetail at one end and defining a slot at its other end, said ball having a dovetail shaped channel for slidably receiving said dovetail at one end of said stem when the ball is assembled in the body, the slot end of the stem being exposed at the opening in the body without extending beyond the body; and, g. a valve handle having a projecting portion terminating in a flat receivable in said slot of said stem, said projecting portion including a bore passing through the flat between opposite sides of the flat, said stem having a threaded tap at the bottom of the slot on its said other end; and a screw passing through said bore and threadedly received in said tap to thereby enable securement of said handle to said stem after completion of said wall structure so that said valve is manually operable by the handle.

2. An under-fixture valve according to claim 1, in which the exterior surface of said valve body has wrench flats to facilitate threading of the valve body to a water supply pipe.

3. An under-fixture valve for threaded connection at one end to an outlet water pipe within a wall structure and at its other end to a fixture pipe leading to a overhead fixture, comprising, in combination, an elongated valve body exteriorly threaded at each end and of a dimension corresponding substantially to that of piping designed to connect to the outlet water pipe so that said body may be threaded to the outlet water pipe and projected from the wall structure and the wall structure itself completed and finished with a minimum of interference with the valve body, said valve body having first and second axially spaced internal circumferential notches and including:

a. a first spilt retaining ring received in the first notch;
  b. a first disc shaped gasket having a hemispherical depression in one face and a central passage positioned in said body so that its opposite face seats against said first spilt retaining ring;
  c. a ball valve having a diametric hole and a surface portion positioned in said hemispherical depression;
  d. a second disc shaped gasket having a hemispherical depression in one face and a central passage positioned in said body so that its one hemispherical depression engages an opposite portion of said ball;
  e. a second spilt retaining ring received in the second notch to engage the opposite face of said second disc shaped gasket whereby said ball is sandwiched between the first and second gaskets to define a valve assembly retained in a central position in said body by the retaining rings;
  f. means for rotating said ball about a diameter to a first position in which the hole in said ball is in alignment with the central passages in the gaskets so that said valve is open, and to a second position in which the hole in said ball is transverse to the central passages in the gaskets so that said valve is closed, said means being exposed through an opening on a side of said body so that there is no projecting part from the surface of said body to interfere with work in finishing the wall, the valve being closed while such work on the wall is being completed so that the main water supply may be left on and there is no necessity of turning off the main water supply when connecting said other end of said valve to said fixture pipe leading to an overhead fixture; and, g. first and second spilt spacing collars internally receivable in opposite ends of said valve body to seat respectively against said first and second spilt retaining rings, the length of each collar equalling one-half the distance between the retaining ring seating the collar and the end of the valve body receiving the collar so that said valve body may be easily inserted in a pipe by cutting a section from the pipe of length equal to the distance between the far ends of the spilt collars, removing the spilt collar fron one end of the valve body and sliding that end over a cut end of the pipe until the cut end engages the retaining ring against which the removed collar was originally seated, and then sliding the other end of the valve body over the other cut end of the pipe until the other end seats against the far end of the remaining collar so that the valve body is precisely centrally located between the cut ends of the pipe, the cut ends then being permanently secured to the valve body.

4. An under-fixture valve for threaded connection at one end to an outlet water pipe within a wall structure and at its other end to a fixture pipe leading to an overhead fixture, comprising, in combination, an elongated valve body exteriorly threaded at each end and of a dimension corresponding substantially to that of piping designed to connect to the outlet water pipe so that said body may be threaded to the outlet water pipe and projected from the wall structure and the wall structure itself completed and finished with a minimum of interference with the valve body, said valve body having first and second axially spaced internal circumferential notches and including:

a. a first spilt retaining ring received in the first notch;
  b. a first disc shaped gasket having a hemispherical depression in one face and a central passage positioned in said body so that its opposite face seats against said first spilt retaining ring;
  c. a ball valve having a diametric hole and a surface portion positioned in said hemispherical depression;
  d. a second disc shaped gasket having a hemispherical depression in one face and a central passage positioned in said body so that its one hemispherical depression engages an opposite portion of said ball;
  e. a second spilt retaining ring received in the second notch to engage the opposite face of said second disc shaped gasket whereby said ball is sandwiched between the first and second gaskets to define a valve assembly retained in a central position in said body by the retaining rings;
  f. means for rotating said ball about a diameter to a first position in which the hole in said ball is in alignment with the central passages in the gaskets so that said valve is open, and to a second position in which the hole in said ball is transverse to the central passages in the gaskets so that said valve is closed, said means being exposed through an opening on a side of said body so that there is no projecting part from the surface of said body to interfere with work in finishing the wall, the valve being closed while such work on the wall is being completed so that the main water supply may be left on and there is no necessity of turning off the main water supply when connecting said other end of said valve to said fixture pipe leading to an overhead fixture; and, g. an anti-hammer device comprising a pipe section having a surge chamber laterally in communication with the central passage in said pipe section, one end of the pipe section being telescopically receivable in one end of said valve body and including a compression ring and nut for threading to the exterior threads on the one end of the valve body to provide a sealed connection, the other end of the pipe section terminating in external threads of the same size as the external threads of said valve body for connection to said fixture pipe.

5. An under-fixture valve according to claim 4, including a drain plug in said pipe section to permit draining of accumulated water in said surge chamber.

* * * * *